United States Patent
Schmidt et al.

(10) Patent No.: US 9,021,893 B2
(45) Date of Patent: May 5, 2015

(54) HIGH SURVIVABILITY FLUID FLOW SENSOR HAVING A LOAD CELL FOR DETECTING LOADING ON THE SENSOR PROBE

(71) Applicant: Exquadrum, Inc., Adelanto, CA (US)

(72) Inventors: Eric Schmidt, Hesperia, CA (US); Elias Wilson, Adelanto, CA (US); Landon Stevens, Apple Valley, CA (US); Lior Inberg, Adelanto, CA (US)

(73) Assignee: Exquadrum, Inc., Adelanto, CA (US)

( * ) Notice: Subject to any disclaimer, the term of this patent is extended or adjusted under 35 U.S.C. 154(b) by 137 days.

(21) Appl. No.: 13/710,107

(22) Filed: Dec. 10, 2012

(65) Prior Publication Data

US 2014/0020480 A1    Jan. 23, 2014

Related U.S. Application Data

(60) Provisional application No. 61/568,468, filed on Dec. 8, 2012.

(51) Int. Cl.
  *G01F 1/28*  (2006.01)
  *G01P 5/02*  (2006.01)
  *G01P 5/04*  (2006.01)

(52) U.S. Cl.
  CPC ... *G01F 1/28* (2013.01); *G01P 5/02* (2013.01); *G01P 5/04* (2013.01)

(58) Field of Classification Search
  None
  See application file for complete search history.

(56) References Cited

U.S. PATENT DOCUMENTS

| | | | |
|---|---|---|---|
| 3,408,855 A | 11/1968 | Slykhouse | |
| 4,322,157 A | 3/1982 | Miura et al. | |
| 4,366,718 A | 1/1983 | Nelson | |
| 4,615,214 A | 10/1986 | Burns | |
| 4,905,513 A | 3/1990 | Burgos | |
| 5,339,535 A * | 8/1994 | McMurtry et al. | 33/561 |
| 5,349,543 A * | 9/1994 | Buliszyn et al. | 702/41 |
| 5,404,649 A * | 4/1995 | Hajdukiewicz et al. | 33/503 |
| 5,505,005 A * | 4/1996 | McMurtry et al. | 33/561 |
| 6,790,186 B1 * | 9/2004 | Field et al. | 600/587 |
| 7,232,415 B2 * | 6/2007 | Steinberg | 600/587 |
| 7,313,851 B2 * | 1/2008 | Wang et al. | 29/243.523 |
| 2007/0167819 A1 * | 7/2007 | Osborn et al. | 600/462 |
| 2011/0203356 A1 * | 8/2011 | Scherbring | 73/84 |

* cited by examiner

*Primary Examiner* — Harshad R Patel
(74) *Attorney, Agent, or Firm* — Hamre, Schumann, Mueller & Larson, P.C.

(57) ABSTRACT

A high survivability fluid flow sensor includes a sensor housing defining an interior space. A sensor probe has a first end disposed within the interior space. The sensor probe also includes a second end opposite the first end outside the interior space. At least one load cell is disposed within the interior space and is operatively engaged with the first end of the sensor probe. The load cell is configured to detect loading on the sensor probe as a result of fluid flow impinging on the sensor probe adjacent to the second end. The sensor is operable to capture fluid flow data history through an over pressure event via the sensor probe, which exerts pressure upon the piezoelectric load cell(s), thereby enabling analysis of the wave fluid dynamics.

23 Claims, 10 Drawing Sheets

HIGH SURVIVABILITY FLUID FLOW SENSOR HAVING A LOAD CELL FOR DETECTING LOADING ON THE SENSOR PROBE

STATEMENT OF GOVERNMENT INTEREST

The sensor disclosed herein was in part made with U.S. government support under contracts HDTRA1-08-P-0027 and HDTRA2-10-C-0001 awarded by the Defense Threat Reduction Agency (DTRA). The U.S. government has certain rights in the invention.

FIELD

A sensor is provided that is operable to measure and record fluid, including but not limited to gas, flow direction and velocity resulting from an over-pressure event, including but not limited to a detonation. In particular, a fluid flow sensor is provided which is operable to capture fluid flow data history through an over-pressure event.

BACKGROUND

In some circumstances it is desired to capture flow direction and velocity data in the hostile flow field produced from the dynamic pressure within the rapid expansion of gas products. Such an environment is commonly produced by explosive detonations. The environment experienced during a detonation inside of a multi-room structure comprises not only the shock and blast loading characterized by a very rapid release of energy, but also the fragmentation from the bomb casing material and the associated fragmentation of the internal structure and its associated contents. As the expanding gas flow moves from regions of confined high pressures to lower pressures, an energy wavefront from the detonation, as well as physical debris in the flow field, makes it difficult to use traditional "clean flow" instrumentation, such as hot-wire anemometry, pitot-tube or other conventional flow measurement methods. Thus, there has been a need to provide a sensor capable of operating in the hostile environment of detonation events.

The flow conditions inherent during an internal structure weapon detonation event are far from ideal for existing sensor technologies. The rapid expansion of gas products cause high velocity gas movement within the multi-room structure that is driven by the high-to-low pressure mechanism referred to as dynamic pressure. As the event unfolds, the detonation shock wavefront propagates through the structure in the form of a high temperature gas flow carrying the remnants of the explosive case, debris within the structure, and test specific artifacts (desks, chairs, containers, shelves, etc.) at high speeds. Testing has demonstrated that this flow field is far from clean and contains massive amounts of high temperature gas/particulates and debris. Further, the hostile environment destroys sensors and produces zero visibility. It is in this extreme condition that existing traditional sensors experience shortcomings.

Dynamic pressure sensors currently in use at DTRA test facilities typically use Wheatstone bridge type circuitry to measure pressure conditions using pitot-static probes such as the DTRA XCW-8WN-200 probe. This type of sensor measures along a streamline and produces unidirectional dynamic pressure for subsonic single-phase flow conditions. The nature of the sensing ports makes it susceptible to contamination from particulate matter and physical damage from debris impact. To provide any level of directionality to this type of measurement system requires many such probes to be oriented in the flow with a substantial investment in calibration of the probes. Multi-hole pressure probes can provide up to a 70° receptivity flow angle, but require 5-7 pressure transducers to achieve that cone of flow directionality. They too suffer from the contamination and debris issues mentioned for the current pitot-static tube systems, and have the requirement for dry and non-reactive gases.

Another suite of existing sensor technologies that initially appears attractive but suffer from the hostile environment and the zero visibility are those that use laser array attenuation, particle image velocimetry or other visible tracking techniques. In addition to the technical difficulties in deploying systems of this type, cost considerations necessarily preclude these solutions from being cost-effective approaches.

Measuring wind speeds through the use of piezoelectric load sensors has been accomplished in the past. For example, U.S. Pat. No. 4,615,214, issued Oct. 7, 1986, entitled, Piezoelectric Wind Sensor, provides an array of piezoelectric sensors mounted around the circumference of a vertical shaft, as disclosed in FIGS. 1 and 2 of the patent. The shaft is forced against the sensors by the wind, and by observing the direction of greatest force magnitude, the direction of the wind can be determined. The speed of the wind is also determined through the force readings by inserting the largest force reading into a look up table that is calibrated to read velocity.

However, many piezoelectric crystals are needed to realize a velocity vector in the '214 design, and the piezoelectric components are exposed to the elements, which make its use in detonation environments problematic.

In U.S. Pat. No. 4,366,718, issued Jan. 4, 1983, entitled "Bi Directional Flow Transducer", fluid flows through a restriction core mounted in the center of cylindrical packaging. Flow impacts the restriction core and causes it to slide along the centerline of the outer casing in the direction of fluid flow. The flow restricting core deflects relative to the spring constant of the two movement restricting springs mounted on either side of it. The restriction core is attached to a probe that deflects axially along with the core. A linear differential voltage transducer (LVDT) senses the probe's deflection and produces an electrical profiling of the spring's contraction. However, LVDTs are too large to use in sensors used to measure 2D flow fields, as desired herein. In fact, two units would be needed, and the size of the casing would be directly proportional to how accurate the LVDTs were.

In U.S. Pat. No. 4,332,157, issued Jun. 1, 1982, entitled "Pyroelectric Anemometer Concept", two pyroelectric sensors sandwich a heating element. In no wind conditions, the heating element affects both sensors the same, and each are a fluctuating median temperature. In windy conditions, the upstream sensor is cooled, while downstream sensor is heated due to the wind forcing more convective heat transfer from the heating element to the downstream sensor than in the no wind condition. This type of design is not applicable in sensing detonation events, as heating is not an optimal means by which to gather data on explosive wind events due to their quick duration and the necessity of equilibrium. Differential temperatures between the sensors would still exist no matter how hot the explosive event, but with extremely high wind temperatures, the ability to measure differential temperatures diminishes and would be costly. Further, this type of sensor has no ability to resolve direction.

U.S. Pat. No. 4,905,513, issued Mar. 6, 1990, entitled "Wind Speed Measuring Device", the temperature difference between the heated coil and the casing of the sensor is measured with the difference being the change in temperature due to the wind. This differential temperature is processed to compute wind speed, while wind direction is realized by processing the signals of each wire around the periphery of the cylinder and computing the direction of the largest gradient. With such a design, extreme wind conditions could have adverse effect on small wires, and certain processing must be dedicated to accounting for changes in ambient temperature. Accordingly, fatigue and embrittlement may cause inaccurate readings over time.

In U.S. Pat. No. 3,408,855, issued on Nov. 5, 1968, entitled "Apparatus for determining detonation velocity of explosives", a sensor is provided wherein the pressure of a detonation event collapses the conductive outer shell over a length of resistive coiled wires. The change in resistance of the wires is used to mathematically derive the velocity of air hitting the sensor. This sensor, however, is solely based on pressure, and the effect of temperature on the resistivity of wire is not accounted for. Further, the outer casing permanently collapses upon each detonation, and is therefore not reusable.

A current commercial one dimensional air blast sensor being used to measure detonations is the LC33 Canadian piezoelectric instrument (DTIC ADA302543), which is a pencil model which has a sensitive element consisting of a short cylinder of lead zirconate titanate with a sensitivity of 120 pc/psi. Testing of this sensor has shown it to be problematic, possibly due to stressing in sensitive elements. It displayed unsatisfactory performance in detonation tests conducted under the Monograph Air Blast Instrumentation (MABS) project.

The MQ10 British piezoelectric instrument, illustrated in FIG. 1, is another commercially available sensor. It is comprised of a quartz crystal with a hatched-shaped streamline baffle and sensitivity of 100 pc/psi from 1 to 70 psi. The MQ10 gage is ranged from 1 to 300 psi. It usually mounted in a concrete block, flush with ground surface.

Although this gage gave the nearest approximation to true pressure-time variations in blast wave of all gage types deployed in the Monograph Air Blast Instrumentation (MABS) project, this device was not designed for multiaxial applications, and post processing is thus necessary to derive wind velocity.

The commercially available KKQ American piezoelectric instrument, illustrated in FIG. 2, uses piezo-electric elements to measure dynamic pressures by observing the difference in stagnation and side on pressures. This gage showed promising results in the Monograph Air Blast Instrumentation (MABS) tests, and was the only gage presented that had the ability to directly determine wind speed. However, it does not resolve direction, and is in effect a piezo-electric, pitot-static probe.

Other such devices have been patented with similar characteristics as those above. In the case of sensing wind speed from a detonation event, it would be impractical to use small wires for durability reasons unless properly shielded. The extremely brief test durations would limit the possibility of thermodynamic equilibrium occurring between resistive wires and the gas flow, therefore thermodynamic metal expansion is inapplicable.

A probe based sensor system that has the fidelity to measure gas flow velocity and direction yet survive the hostile environment of a detonation event would be desirable.

SUMMARY

A high survivability fluid flow sensor is described that is operable to measure and record fluid flow direction and velocity resulting from an over-pressure event. The over-pressure event can be produced by, but is not limited to, a detonation (i.e. explosion) or other events associated with a very rapid release of energy. The fluid flow sensor is particularly suited for use with flows of gas resulting from the over-pressure event. But the fluid flow sensor can be used with any fluids.

In one embodiment, a dynamic pressure induced fluid flow sensor is provided that includes a sensor housing defining an interior space, and a sensor cap disposed on the sensor housing and closing the interior space, the sensor cap having a probe port formed therein. A sensor probe has a first end mounted to the sensor housing and is disposed within the interior space. The sensor probe also includes a second end opposite the first end and extending away from the sensor cap outside the interior space where it is exposed to the fluid flow environment. The sensor probe extends through the probe port in the sensor cap. At least one load cell is disposed within the interior space and is operatively engaged with the first end of the sensor probe. The load cell is configured to detect loading on the sensor probe as a result of fluid flow impinging on the exposed portion of the sensor probe adjacent to the second end.

In another embodiment, a one-dimensional (1D) high survivability fluid flow sensor is provided having a somewhat similar construction. However, the 1D sensor constrains the fluid flow measurement along only one axis, and can contain as few as one load cell, and two load transfer blocks.

DETAILED DESCRIPTION

Figure 1:
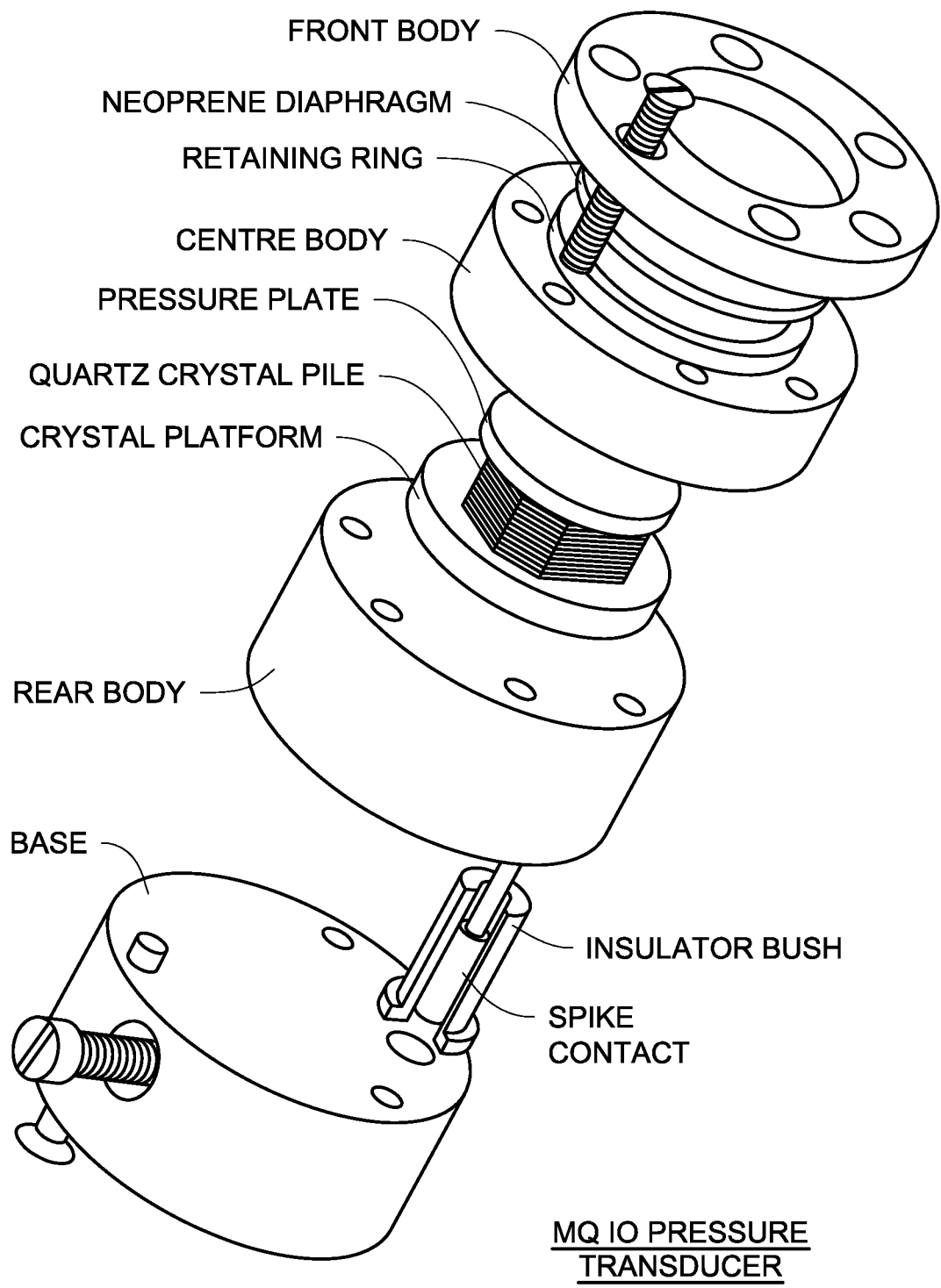
FIG. 1 illustrates a known prior art pressure transducer.
Figure 2:
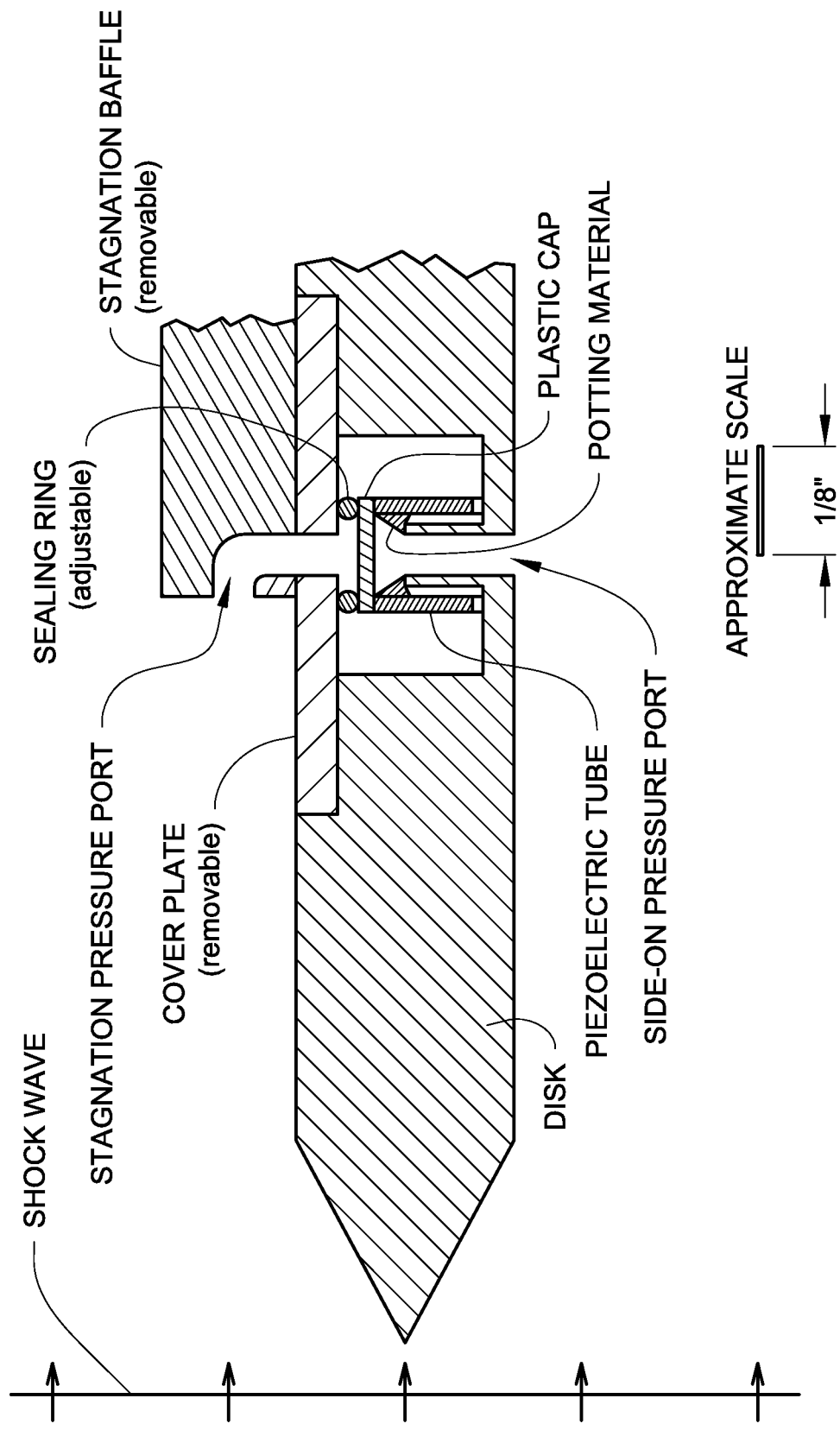
FIG. 2 illustrates a known prior art piezoelectric pressure sensor.
Figure 3:
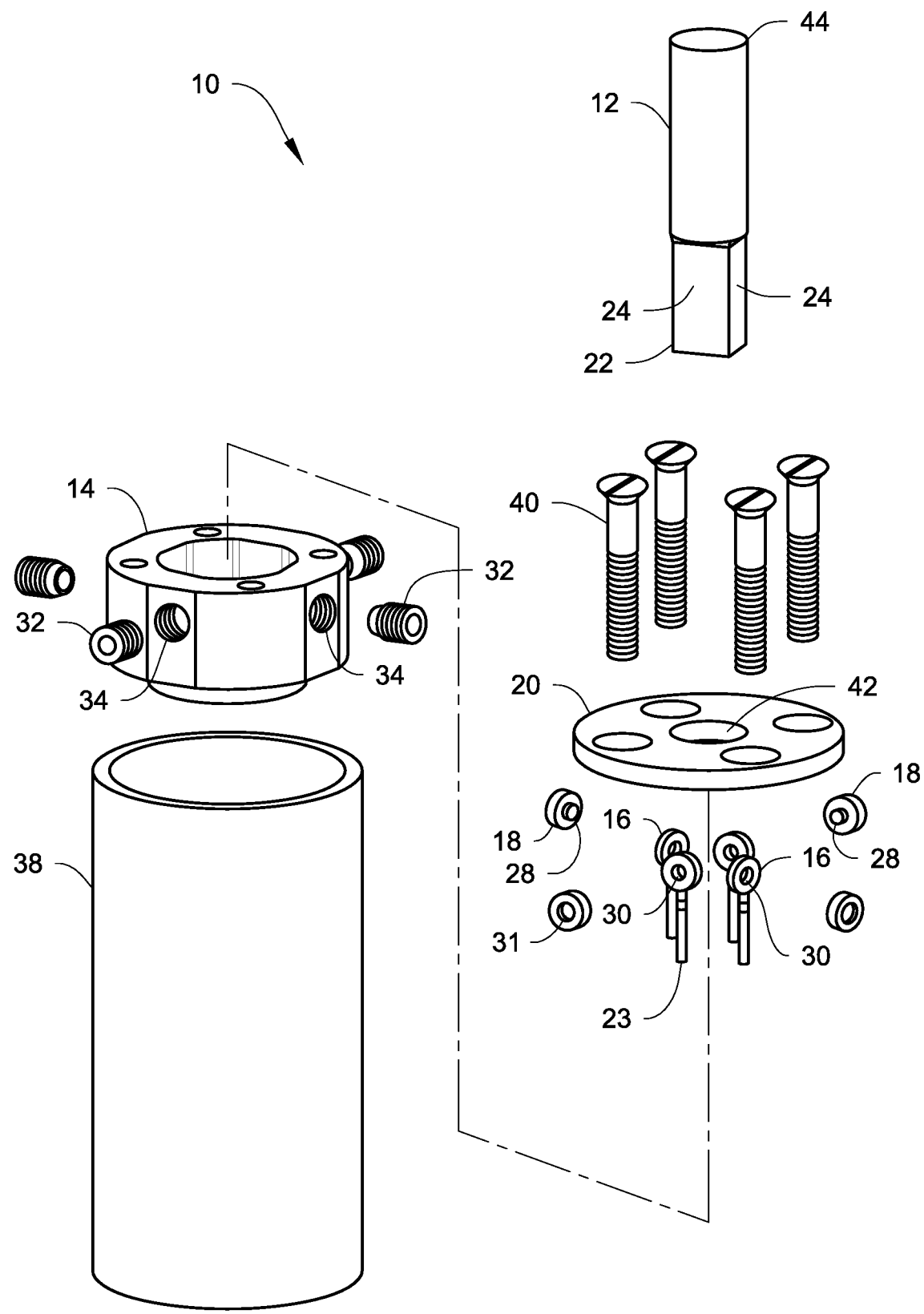
FIG. 3 is an exploded perspective view of a two-dimensional fluid flow sensor described herein, also referred to as a compact cartridge gage ("CCG").

FIG. 3 illustrates a two-dimensional fluid flow sensor 10 that is operable to measure and record fluid flow direction and velocity resulting from an over-pressure event such as a detonation. Hereinafter, the fluid that is measured and recorded will be described as being gas, and the flow sensors described herein will be described as being gas flow sensors. However, it is to be realized that the sensor could be used to measure and record other fluids.

The gas flow sensor 10, which can also be referred to as a CCG, is generally comprised of a sensor probe 12 which rests in a sensor housing 14, four piezoelectric load cells 16, four load transfer blocks 18 which act to place the load cells 16 in communication with the sensor housing 14, and a sensor cap 20 which protects the interior space 21 of the sensor housing 14 from debris.

As shown in FIG. 3, in one embodiment, the outer surface of the sensor probe 12 adjacent to a first end 22 thereof is machined to have at least four flat surfaces 24, thereby providing flat surfaces for interaction with the load cells 16. The flat surfaces 24 are in contact, for example direct contact, with the load cells 16. Cutting the flat surfaces as close as possible to parallel and perpendicular allows for a proper load transmission to the load cells 16 and gives the best performance. The sensor probe 12 can be formed of a high strength metallic compound, such as tungsten carbide, thus enabling it to withstand high pressure detonations and providing it with high survivability characteristics. Unlike previous designs, this new design allows the sensor probe 12 to be relatively short in length while still providing sufficient sensitivity.

Figure 4:
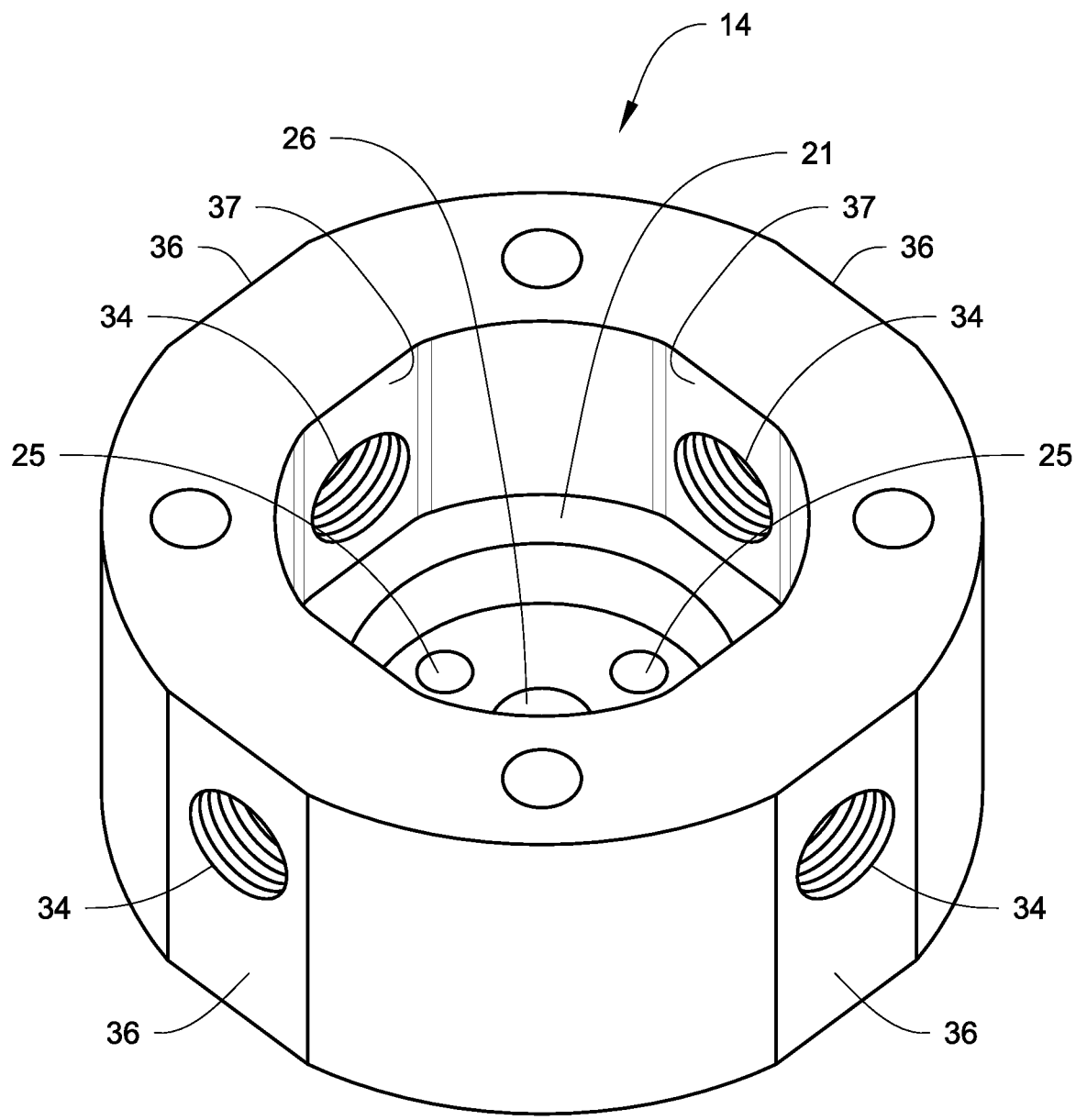
FIG. 4 is a perspective view of the sensor housing element of the two-dimensional fluid flow sensor shown in FIG. 3.

In one embodiment, a high-tolerance hole (not illustrated) is machined into the bottom of the sensor probe 12 adjacent to the first end 22 thereof to accept a boss 26 on the sensor housing 14 (see FIG. 4). The boss 26 interface will support the probe 12 equally in all flow directions, preventing deflection that could cause improper loading of the load cells 16. In the illustrated embodiment, the boss 26 is disposed on or adjacent to the vertical axis of the sensor housing 14, for example by being machined into the center of the sensor housing 14.

The load cells 16 can be any piezoelectric type load cells. For example, Applicant has found that suitable load cells 16 can include, but are not limited to, Kistler 9132B load cells available from Kistler Group of Winterthur, Switzerland. The load cells 16 are disposed with the load blocks 18 within the interior space 21 of the housing 14. The load cells 16 include cabling 23 that is routed through openings 25 formed at the base of the housing 14 (see FIG. 4).

With reference to FIG. 3, the sensor load blocks 18 are designed to both orient and preload the piezoelectric load cells 16. A boss 28 is located on each of the sensor load blocks 18 that aligns with a hole 30 in the respective load cell 16. The boss 28 prevents lateral movement of the load cells 16 during installation. The sensor load blocks 18 and the load cells 16 are preloaded using off-the-shelf flat end set screws 32 that are threaded into threaded openings 34 formed in the sensor housing 14. The openings 34 are formed on flat surfaces 36 formed on an outer perimeter, illustrated as being generally circular, of the sensor housing 14. Similar flat surfaces 37 are formed opposite the flat surface 36 on an inner perimeter, illustrated as being generally circular, of the sensor housing 14. The ends of the set screws 32 engage with the sides of the load blocks 18 opposite the bosses 28 to apply a force to the load blocks, which in turn allows application of a preload to the load cells 16. Optionally, the load blocks 18 can include recesses 31 for receiving ends of the set-screws 32.

The sensor housing 14 is the element of the CCG with the highest complexity. The housing 14 houses the sensor probe 12, the load cells 16 and the sensor load blocks 18, as well as providing support for the sensor probe. The housing 14 can be sized to fit inside a DTRA small gage port 38 in a low profile type installation to be flush with a test facility wall. As shown in FIG. 3, the sensor cap 20 is mounted to the sensor housing 14, adjacent to the top surface thereof, using fasteners 40 such as screws that extend through openings formed through the housing 14 and thread into openings formed in a ledge (a similar ledge 124 is visible in FIG. 5) within the gage port 38. The sensor cap 20 also includes a probe port 42 formed therein through which a second end 44 of the sensor probe 12 extends to perform its sensing function in a manner similar to that discussed below for FIGS. 7 and 8. The sensor cap 20 also helps to protect the load cells 16 from debris.

In use of the sensor 10, a high pressure fluid is generated from a detonation or other over-pressure creating event that impacts the probe 12 and deflects the second end 44. The probe 12, by virtue of the high stiffness of its formed material, transfers the deflection to the force sensors 16. As the fluid flows around the exposed end of the probe 12, the force sensors 16 react the deflection through the sensor load blocks 18 into the housing 14, resolving the direction and velocity of the fluid flow into two dimensions. Opposing force sensors 16 at the first end 24 of the probe 12 work in a near equal and opposite manner and are superimposed electrically to provide force data on each of two dimensions, or flow axes. The force data from opposing force sensors 16 constitute the data that can be added vectorally to produce a final flow vector, or in other words the fluid flow direction and velocity.

Figure 5:
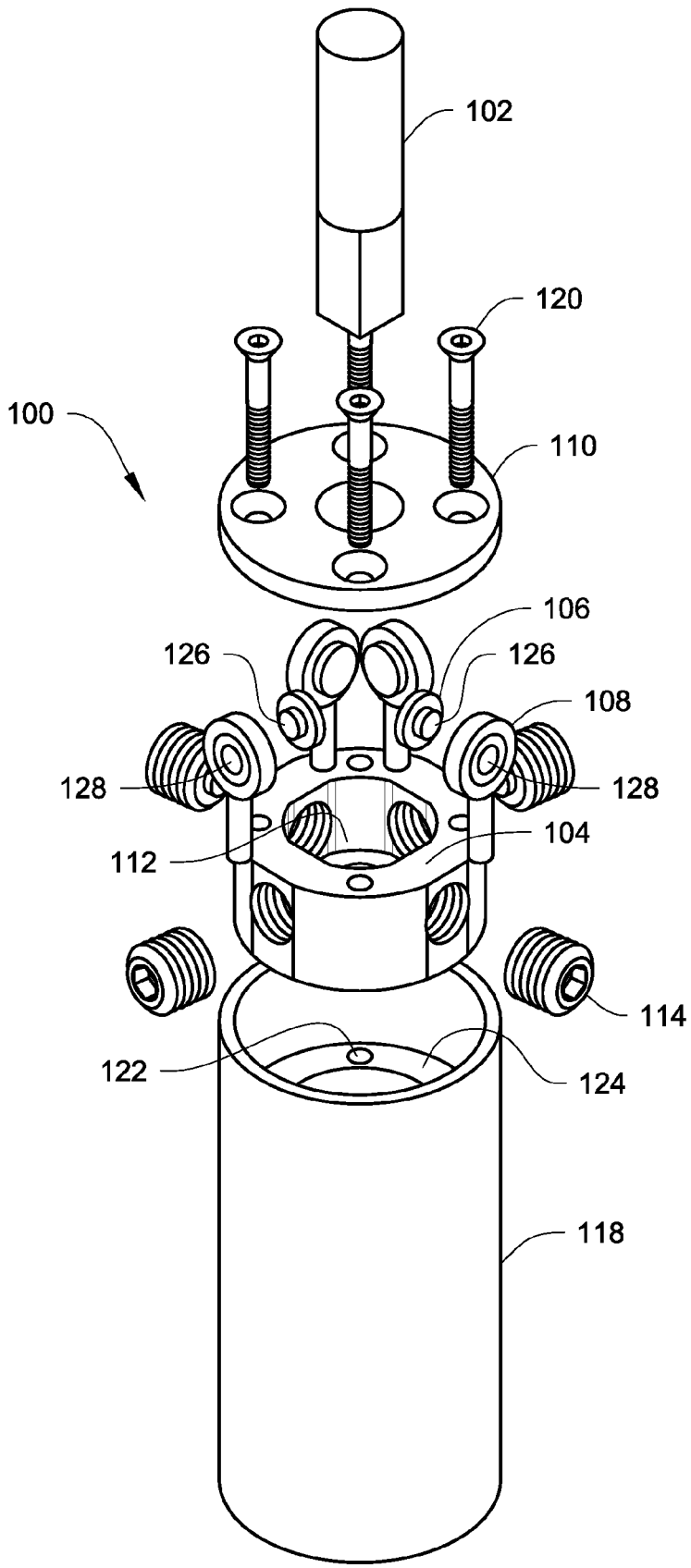
FIG. 5 is an exploded perspective view of another embodiment of a two-dimensional fluid flow sensor described herein.

FIG. 5 illustrates another embodiment of a fluid flow sensor 100 that is generally similar to the sensor 10 including a sensor probe 102, a sensor housing 104, four piezoelectric load cells 108, four load transfer blocks 106, and a sensor cap 110 which protects the interior space 112 of the sensor housing 104 from debris. The load transfer blocks 106 and the load cells 108 are preloaded using set screws 114 that are threaded into threaded openings formed in the sensor housing 104. The housing 104 can be sized to fit inside a DTRA small gage port 118 in a low profile type installation to be flush with a test facility wall. The sensor cap 110 is mounted to the sensor housing 104, adjacent to the top surface thereof, using fasteners 120 such as screws that extend through openings formed through the housing 104 and thread into openings 122 formed in a ledge 124 within the gage port 118.

One way in that the sensor 100 differs from the sensor 10 is that each of the load blocks 106 includes a boss 126 that fits within an opening 128 formed in the respective load cell 108. The bosses 126 prevent lateral movement of the load cells 108 relative to the load transfer blocks 106.

Figure 6:
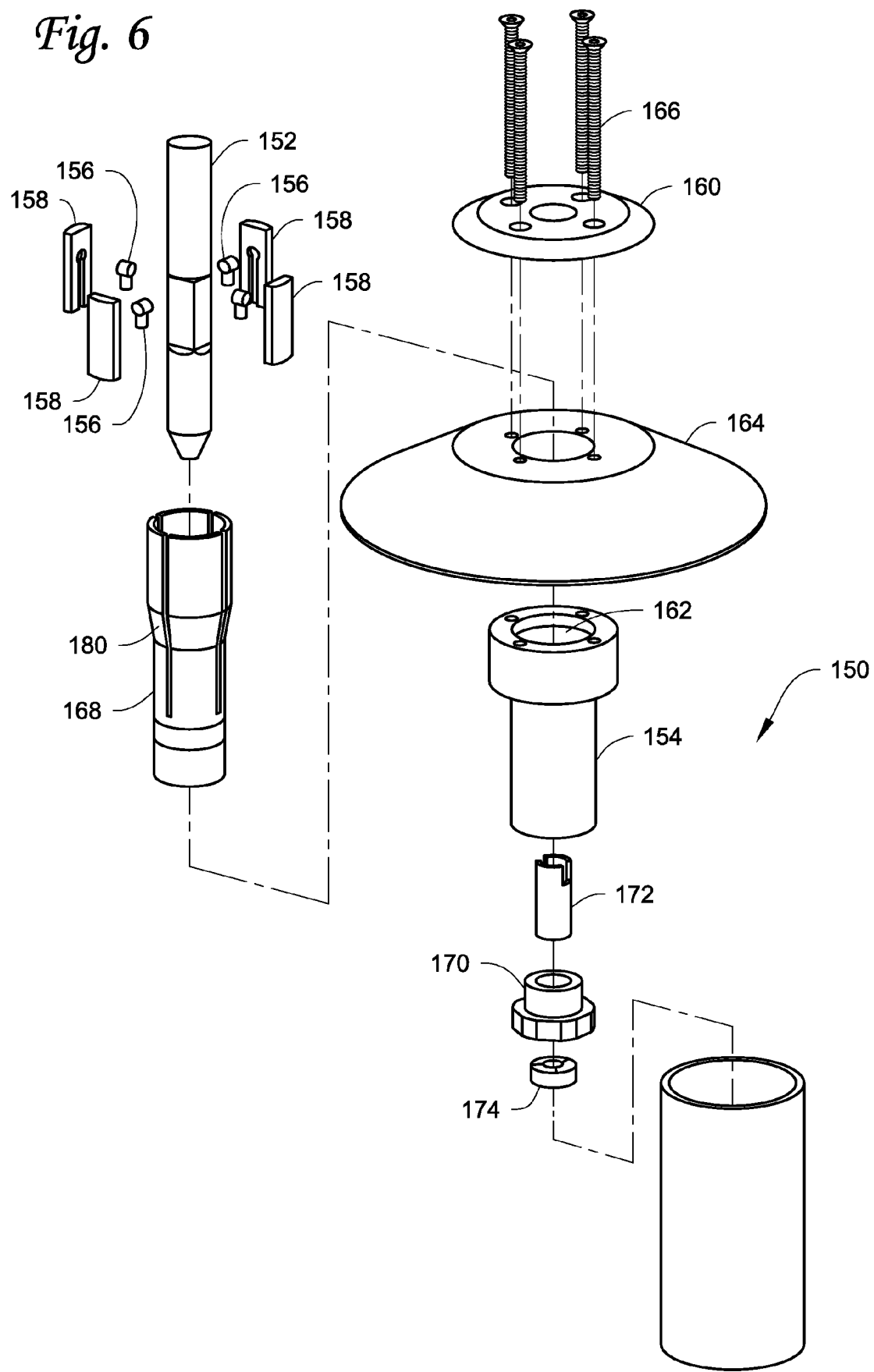
FIG. 6 is an exploded perspective view of still another embodiment of a two-dimensional fluid flow sensor described herein, also referred to as a symmetric cartridge gage ("SCG").

FIG. 6 illustrates another embodiment of a fluid flow sensor 150, also referred to as a SCG. In this embodiment, the sensor 150 includes a sensor probe 152, a sensor housing 154, four piezoelectric load cells 156, four load transfer support blocks 158 which support the load cells 156 and help to place the load cells 156 in communication with the sensor housing 154, and a sensor cap 160 which protects the interior space 162 of the sensor housing 154 that contains the load cells 156 and the like from debris.

In this embodiment, the sensor 150 also includes a deflection ramp 164 that is secured to the top of the housing 154 by the cap 160 and the fasteners 166. The deflection ramp 164 is configured to shield the interior space 162 and deflect debris during an over pressure event. In the illustrated example, the deflection ramp 164 has a frustoconical shape. However, the ramp 164 can have any shape that achieves the shielding and deflection functions.

The sensor 150 also includes a collet sleeve 168 that in use is disposed within the housing 154. When assembled, the collet sleeve 168 surrounds the sensor probe, 152, the load cells 156, and the support blocks 158 for applying a pre-load to the support blocks 158. The pre-load is changed by increasing or decreasing the diameter of the collet.

Figure 6A:
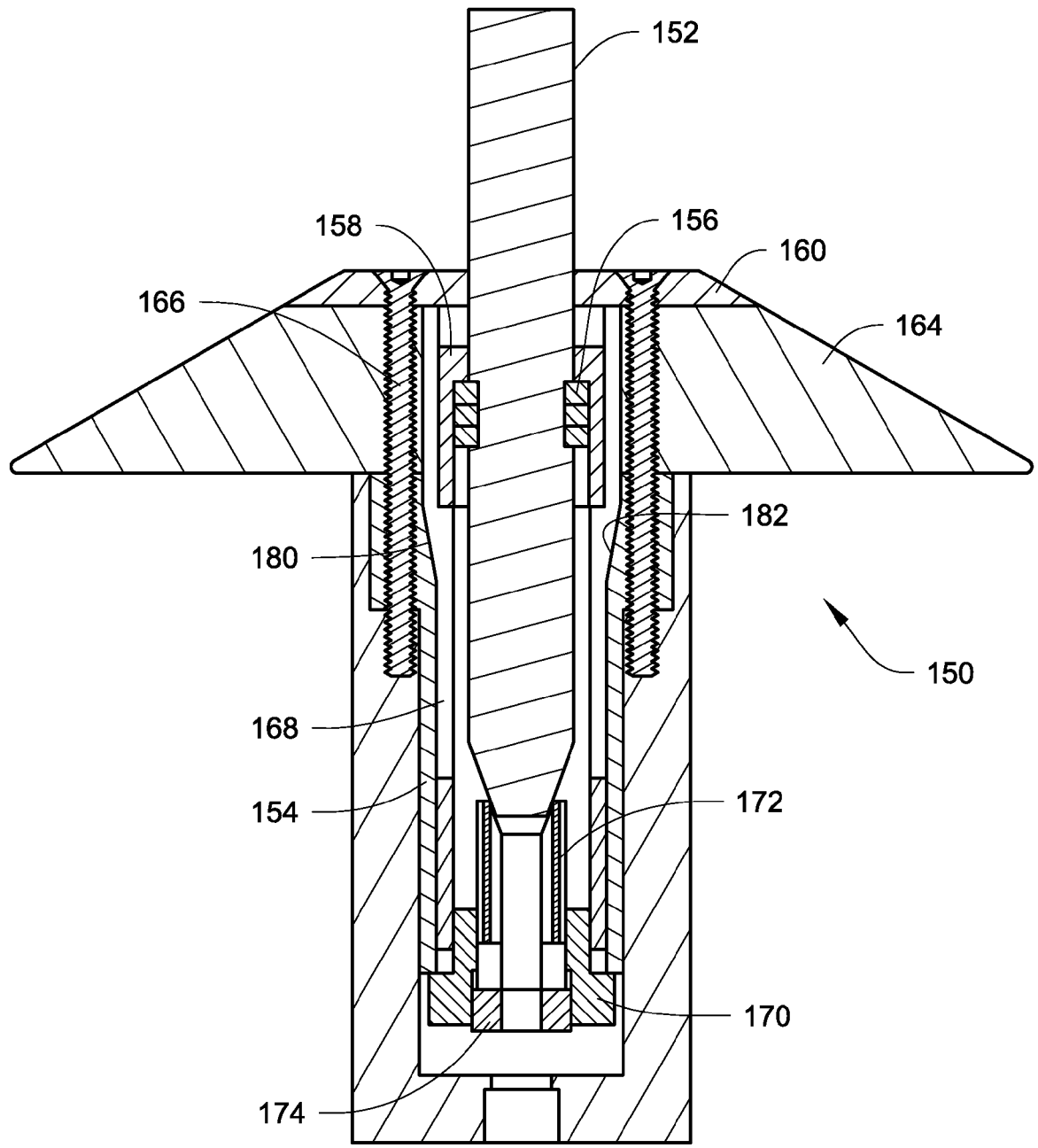
FIG. 6A is a cross-sectional view of the sensor shown in FIG. 6 in an assembled state.

As shown in FIGS. 6 and 6A, the collet sleeve 168 has an exterior tapered ramp surface 180 that is engageable with a tapered ramp surface 182 formed inside the housing 154. By forcing the collet sleeve 168 in a longitudinal direction (i.e. axially) within the housing 154, the ramp surface 180 engages with the ramp surface 182. As the collet sleeve 168 is forced axially downward, the engagement between the ramp surfaces 180, 182 reduces the diameter of the collet sleeve thereby increasing the pre-load force. As the collet sleeve 168 is forced axially upward, the engagement between the ramp surfaces 180, 182 is reduced, allowing the diameter of the collet sleeve to increase thereby decreasing the pre-load force.

The collet sleeve is forced to move axially within the housing 154 via a threaded pre-load nut 170 that is threaded onto the base of the collet sleeve 168. Rotation of the pre-load nut 170 in one direction pulls the collet sleeve 168 down into the housing 154, forcing the ramp surfaces 180, 182 into engagement and causing the collet to tighten uniformly on the four load transfer support blocks 158, and subsequently tightening onto the probe 152 through the load cells 156. Rotation of the pre-load nut 170 in the opposite direction, forces the collet sleeve 168 upward into the housing 154, reducing the pinching force caused by the ramp surfaces and allowing the diameter of the collet sleeve to increase to reduce the clamping force on the load transfer support blocks 158.

The base end of the sensor probe 152 is supported in a probe support sleeve 172 which is retained by a lock nut 174, providing a vertical support during assembly and a pivot point for the probe. The probe support sleeve 172 is notched to allow for routing of the load cell 156 cabling.

Figure 7:
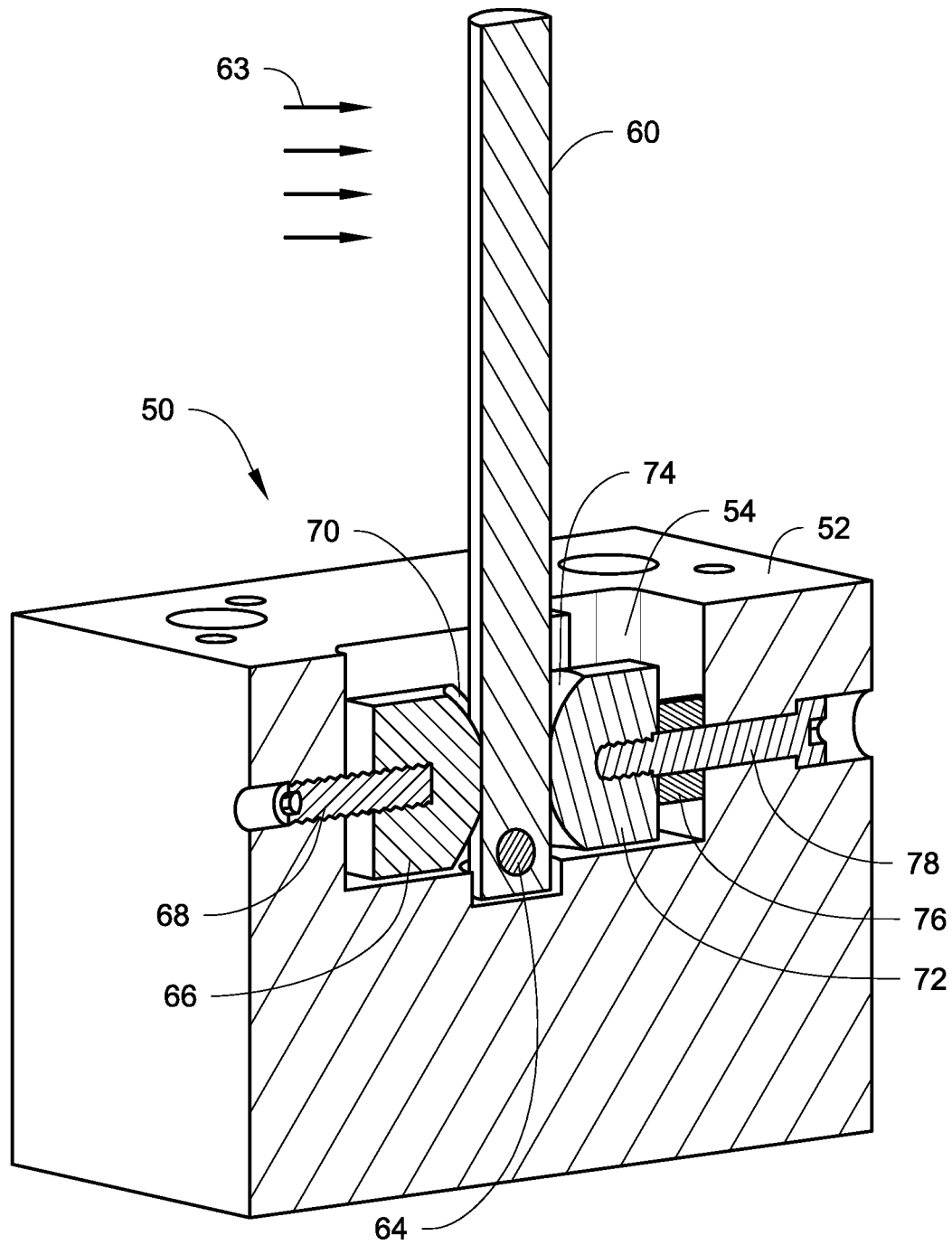
FIG. 7 is a partial perspective cross sectional view of the one-dimensional sensor described herein. The fluid flow direction is indicated by the arrows.
Figure 8:
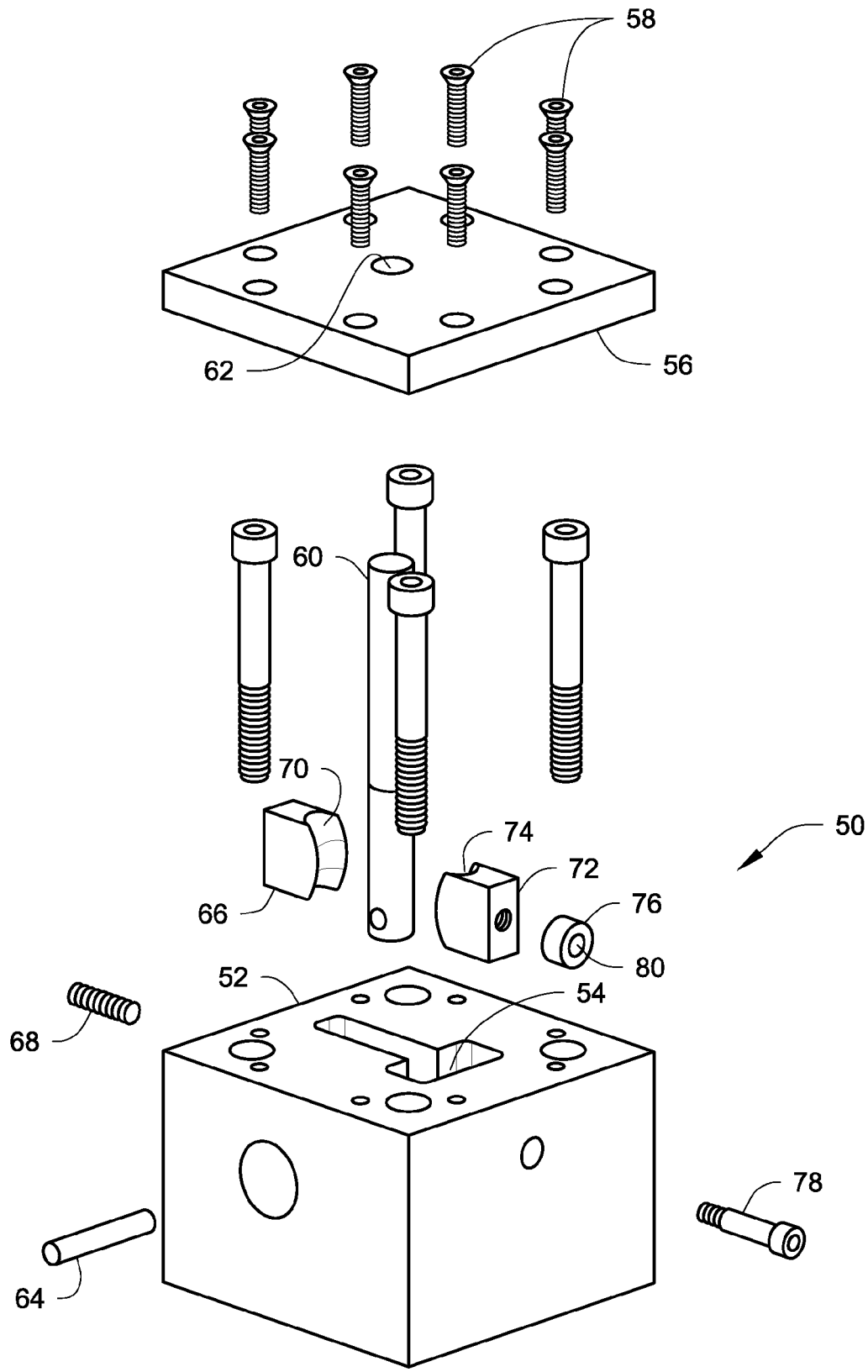
FIG. 8 is an exploded perspective view of the one-dimensional sensor of FIG. 7.

With reference to FIGS. 7 and 8, an exemplary embodiment of a one-dimensional (1D) sensor 50 is illustrated. In the sensor 50, the sensor probe is designed to only allow one axis of motion. In this embodiment, this was accomplished by a set of load transfer blocks that precluded the probe from moving laterally relative to the load sensor. However, this is inadequate for the sensor 10 because the sensor probe 12 needs to communicate a full 360 degrees of motion onto at least two (or perhaps more) load cells 16 which are required to resolve the wind velocity vector.

In particular, this embodiment of the sensor 50 is illustrated as including a sensor housing 52 having an interior space 54. The sensor housing 52 is generally rectangular with a rectangular outer perimeter and an inner perimeter defining the interior space. A sensor cap 56 is fixed to the top of the housing 52 by fasteners 58 such as screws to close the top of the housing.

A sensor probe 60 extends through a probe port 62 formed in the sensor cap 56 and into the interior space 54. The lower end of the probe 60 is pivotally secured within the interior space by a pin 64 extending through an opening at the base of the sensor probe 60. The upper end of the probe 60 extends away from the housing 52 where it can be exposed to moving air 63 as shown in FIG. 7.

In addition, disposed perpendicular to the axis of the pin 64 is a load transfer block 66 that is engaged with what can be termed as a pre-load side of the probe 60 to apply a pre-load force to the probe 60. A set-screw 68 or other pre-load mechanism is used to force the block 66 into engagement with the probe 60 to permit application of the pre-load. The end of the load transfer block 66 engaged with the probe 60 is provided with a concavity 70 which permits better engagement between the block 66 and the probe 60 surface.

Another load transfer block 72 is disposed opposite the load transfer block 66. The block 72 is engaged with what can be termed as the sensor or reaction side of the probe 60. Like the block 66, the block 72 is provided with a concavity 74 which permits better engagement between the block 72 and the probe 60. A force sensor 76 is disposed between the block 72 and a wall of the housing 52 to detect force caused by deflections of the end of the probe 60 that extends upwardly from the housing 52. An example of a suitable sensor 76 is a Kistler 9101A sensor available from Kistler Group of Winterthur, Switzerland. A suitable mechanism 78, for example a shoulder bolt, extends through the wall of housing 52, through a hole 80 in the sensor 76, an into engagement with the block 72. The mechanism 78 keeps the block 72, the sensor 76 and the wall of the housing 52 engaged with one another for accurate pressure readings.

In operation of the sensor 50, a high pressure fluid 63 that is generated from a detonation or other over-pressure creating event impacts the probe 60 and deflects the probe. The probe 60, by virtue of the high stiffness of its formed material, transfers the deflection to the force sensor 76.

Figure 9:
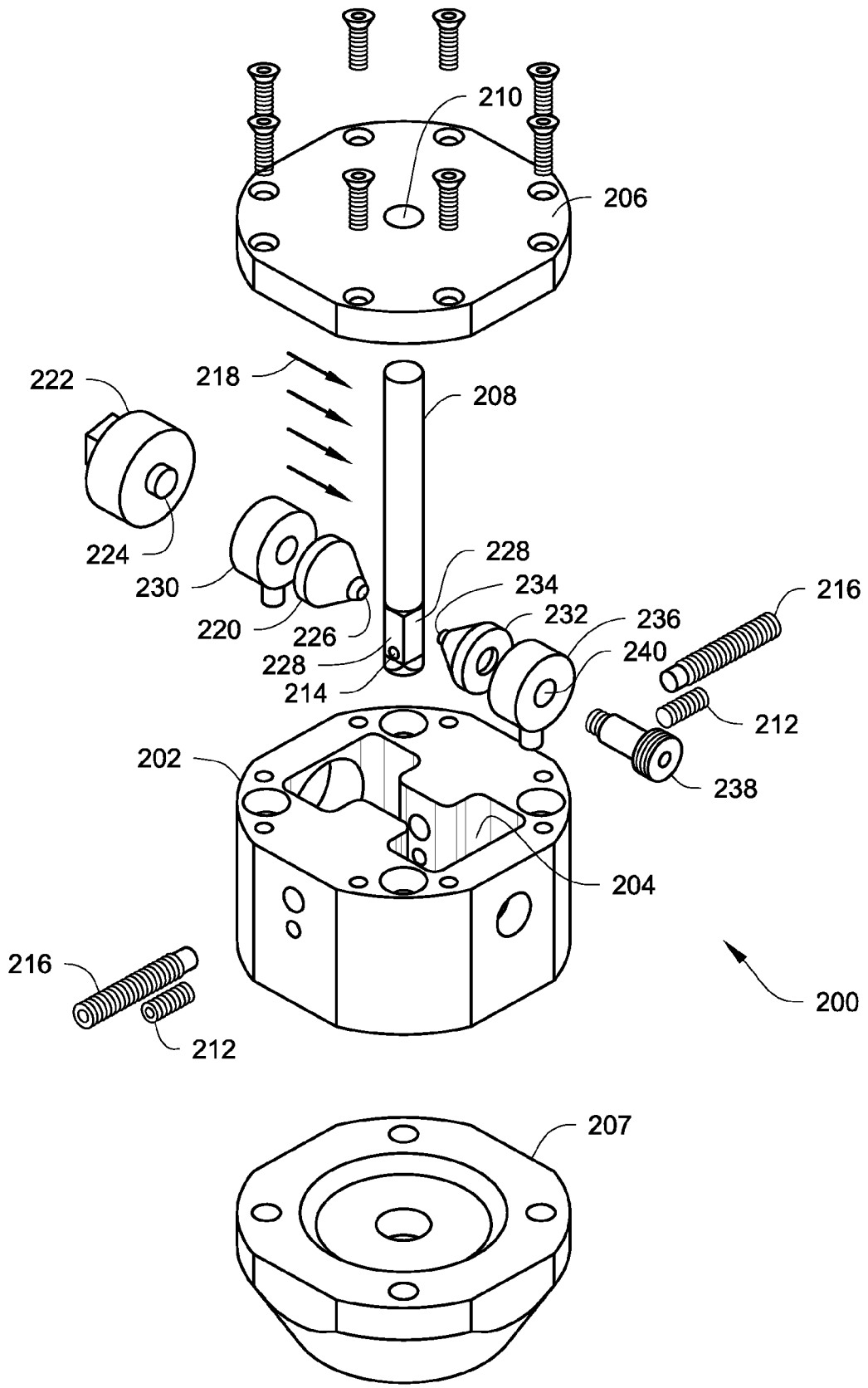
FIG. 9 is an exploded perspective view of another embodiment of a one-dimensional sensor.

FIG. 9 illustrates another embodiment of a one-dimensional (1D) sensor 200 that is configured and operates generally similar to the sensor 50, but includes a pair of load cells. The sensor 200 includes a sensor housing 202 having an interior space 204. The sensor housing 202 is generally rectangular with a rectangular outer perimeter and an inner perimeter defining the interior space. A sensor cap 206 is fixed to the top of the housing 202 by fasteners such as screws to close the top of the housing. The housing 202 can be fixed to a mount 207 via the fasteners extending through the cap 206 and the housing 202 and into suitable apertures in the mount 207.

A sensor probe 208 extends through a probe port 210 formed in the sensor cap 206 and into the interior space 204. The lower end of the probe 208 is pivotally secured within the interior space by one or more conically tipped pins 212 that seat in recesses 214 at the base of the sensor probe 208. The lower end of the probe 208 is secured from lateral motion by opposing set screws 216 The upper end of the probe 208 extends away from the housing 202 where it can be exposed to moving air 218 as shown in FIG. 9.

In addition, disposed perpendicular to the axis of the pivot axis is a load transfer block 220 that is engaged with the side of the probe 208 to apply a pre-load force to the probe 208. A pre-load mechanism 222, for example a set screw, having a centering boss 224 is used to force the block 220 into engagement with the probe 208 to permit application of the pre-load. The end of the load transfer block 220 engaged with the probe 208 is provided with a flat surface 226 that engages one of the flat surfaces 228 (similar to the flat surfaces 24) on the probe 208. A force sensor 230 is disposed between the block 220 and pre-load mechanism 222 and the wall of the housing 202 to detect force caused by deflections of the end of the probe 208 that extends upwardly from the housing.

Another load transfer block 232 is disposed opposite the load transfer block 220. The block 232 is engaged with the opposite side of the probe 208. Like the block 220, the block 232 is provided with a flat surface 234 that engages with the opposite flat surface 228. A second force sensor 236 is disposed between the block 232 and a wall of the housing 202 to detect force caused by deflections of the end of the probe 208 that extends upwardly from the housing. An example of a suitable sensor 230, 236 is a Kistler 9101A sensor available from Kistler Group of Winterthur, Switzerland. A suitable mechanism 238, for example a shoulder bolt, extends through the wall of housing 202, through a hole 240 in the sensor 236, an into engagement with the block 232. The mechanism 238 keeps the block 232, the sensor 236 and the wall of the housing 202 engaged with one another for accurate pressure readings.

In this embodiment, a high pressure fluid 218 is generated from a detonation or other over-pressure creating event that impacts the probe 208 and deflects the flat surface 228. The probe 208, by virtue of the high stiffness of its formed material, transfers the deflection to the force sensors 230, 236. As the fluid flows around the probe 208, the force sensors 230, 236 react the deflection through the sensor load blocks 220, 232 into the housing 202, measuring the direction and velocity of the fluid flow in one dimension. The opposing force sensors 230, 236 on the probe 208 work in a near equal and opposite manner and are superimposed electrically to provide force data in one dimension, or flow axis. The force data from the opposing force sensors 230, 236 constitute the data that can be added mathematically to produce the fluid flow direction and velocity.

Although specific embodiments have been disclosed herein, those having ordinary skill in the art will understand that changes can be made to the specific disclosed embodiments without departing from the spirit and scope of the invention. Thus, the scope of the invention is not to be restricted to the specific disclosed embodiments. Furthermore, it is intended that the appended claims cover any and all such applications, modifications, and embodiments within the scope of the disclosure.

The invention claimed is:

1. A high survivability fluid flow sensor, comprising:
   a sensor housing defining an interior space;
   a sensor cap disposed on the sensor housing and closing the interior space, the sensor cap having a probe port formed therein;
   a sensor probe having a first end mounted to the sensor housing and disposed within the interior space, and a second end opposite the first end and extending away from the sensor cap outside the interior space, the sensor probe extending through the probe port in the sensor cap, the sensor probe has a longitudinal axis extending from the first end to the second end, and the sensor probe has a side surface within the interior space that extends parallel to the longitudinal axis; and
   at least one load cell disposed within the interior space and operatively engaged with the side surface of the sensor probe, the at least one load cell is configured to detect loading on the sensor probe as a result of fluid flow impinging on the sensor probe adjacent to the second end.

2. The high survivability fluid flow sensor of claim 1, wherein the at least one load cell is disposed between the side surface of the sensor probe and a wall of the sensor housing.

3. The high survivability fluid flow sensor of claim 2, comprising a plurality of the load cells disposed within the interior space, and a load transfer block associated with each of the load cells, the load transfer blocks are disposed between the sensor housing and the load cells, and the load cells are disposed between the load transfer blocks and the side surface of the sensor probe.

4. The high survivability fluid flow sensor of claim 3, wherein the side surface comprises a plurality of flat surfaces that extend parallel to the longitudinal axis, and each of the load cells is engaged with a corresponding one of the flat surfaces.

5. The high survivability fluid flow sensor of claim 3, wherein each of the load cells and each of the load transfer blocks are engaged with each other in a manner that prevents relative movement therebetween.

6. The high survivability fluid flow sensor of claim 3, wherein the sensor housing includes a boss in the interior space thereof, and the first end of the sensor probe is mounted to the boss so that the first end is supported by the boss equally in all flow directions.

7. The high survivability fluid flow sensor of claim 6, wherein the first end of the sensor probe includes a hole formed therein, and the boss is disposed in the hole.

8. The high survivability fluid flow sensor of claim 3, wherein the sensor housing has a generally circular outer perimeter, a generally circular inner perimeter, and flat surfaces formed on the inner perimeter and the outer perimeter at locations corresponding to the load cells.

9. The high survivability fluid flow sensor of claim 2, further comprising a first load transfer block associated with the at least one load cell, the first load transfer block is disposed between the side surface of the sensor probe and the load cell, and the load cell is disposed between the load transfer block and the sensor housing.

10. The high survivability fluid flow sensor of claim 9, further comprising a second load block disposed opposite the first load transfer block, and the second load transfer block is engaged with the side surface of the sensor probe.

11. The high survivability fluid flow sensor of claim 2, wherein the first end of the sensor probe is connected to the sensor housing via a pin.

12. The high survivability fluid flow sensor of claim 1, wherein the sensor housing includes a pre-load mechanism that applies an adjustable pre-load force to the load cell.

13. A high survivability fluid flow sensor, comprising:
    a sensor housing defining an interior space;
    a sensor probe having a first end fixedly mounted to the sensor housing and disposed within the interior space, and a second end opposite the first end and extending away from the sensor housing outside the interior space, the sensor probe extending through a probe port formed in the sensor housing; and
    at least one load cell disposed within the interior space and operatively engaged with a side surface of the sensor probe, the at least one load cell is configured to detect loading on the sensor probe as a result of fluid flow impinging on the sensor probe adjacent to the second end.

14. The high survivability fluid flow sensor of claim 13, comprising a plurality of the load cells disposed within the interior space, and a load transfer block associated with each of the load cells, the load transfer blocks are disposed between the sensor housing and the load cells, and the load cells are disposed between the load transfer blocks and the side surface of the sensor probe.

15. The high survivability fluid flow sensor of claim 14, wherein the side surface comprises a plurality of flat surfaces that extend parallel to a longitudinal axis of the sensor probe, and each of the load cells is engaged with a corresponding one of the flat surfaces.

16. The high survivability fluid flow sensor of claim 14, wherein each of the load cells and each of the load transfer blocks are engaged with each other in a manner that prevents relative movement therebetween.

17. The high survivability fluid flow sensor of claim 14, wherein the sensor housing includes a boss in the interior space thereof, and the first end of the sensor probe is fixedly mounted to the boss so that the first end is supported by the boss equally in all flow directions.

18. The high survivability fluid flow sensor of claim 17, wherein the first end of the sensor probe includes a hole formed therein, and the boss is disposed in the hole.

19. The high survivability fluid flow sensor of claim 13, further comprising a first load transfer block associated with the at least one load cell, the first load transfer block is disposed between the side surface of the sensor probe and the load cell, and the load cell is disposed between the load transfer block and the sensor housing.

20. The high survivability fluid flow sensor of claim 19, further comprising a second load block disposed opposite the first load transfer block, and the second load transfer block is engaged with the side surface of the sensor probe.

21. The high survivability fluid flow sensor of claim 13, wherein the first end of the sensor probe is fixedly mounted to the sensor housing via a pin.

22. The high survivability fluid flow sensor of claim 13, wherein the sensor housing includes a pre-load mechanism that applies an adjustable pre-load force to the load cell.

23. A high survivability fluid flow sensor, comprising:
- a sensor housing defining an interior space;
- a sensor cap disposed on the sensor housing and closing the interior space, the sensor cap having a probe port formed therein;
- a sensor probe having a first end mounted to the sensor housing and disposed within the interior space, and a second end opposite the first end and extending away from the sensor cap outside the interior space, the sensor probe extending through the probe port in the sensor cap; and
- at least one load cell disposed within the interior space and operatively engaged with the first end of the sensor probe, the at least one load cell is configured to detect loading on the sensor probe as a result of fluid flow impinging on the sensor probe adjacent to the second end, and the at least one load cell is disposed between a side surface of the sensor probe and a wall of the sensor housing.

* * * * *

UNITED STATES PATENT AND TRADEMARK OFFICE
CERTIFICATE OF CORRECTION

PATENT NO. : 9,021,893 B2
APPLICATION NO. : 13/710107
DATED : May 5, 2015
INVENTOR(S) : Schmidt et al.

Page 1 of 1

It is certified that error appears in the above-identified patent and that said Letters Patent is hereby corrected as shown below:

Title page item (60),

Related U.S. Application Data:

"(60) Provisional application No. 61/568,468 filed on Dec. 8, 2012" should be

-- (60) Provisional application No. 61/568,468 filed on Dec. 8, 2011 --

Signed and Sealed this
Eleventh Day of August, 2015

Michelle K. Lee
*Director of the United States Patent and Trademark Office*